United States Patent [19]
Tanaka

[11] Patent Number: 5,825,747
[45] Date of Patent: Oct. 20, 1998

[54] DISC CARTRIDGE HAVING LID MEMBER WITH GUIDE PORTIONS

[75] Inventor: Satoshi Tanaka, Yokohama, Japan

[73] Assignee: Kabushiki Kaisha Toshiba, Kawasaki, Japan

[21] Appl. No.: 741,219

[22] Filed: Oct. 29, 1996

[30] Foreign Application Priority Data

Oct. 30, 1995 [JP] Japan .................................... 7-281682

[51] Int. Cl.⁶ .................................................. G11B 23/03
[52] U.S. Cl. ........................................... 369/291; 360/133
[58] Field of Search ................................... 369/291, 289, 369/292, 290; 360/133; 206/444

[56] References Cited

U.S. PATENT DOCUMENTS

| | | | |
|---|---|---|---|
| 5,093,823 | 3/1992 | Ouwerkerk et al. | 369/291 |
| 5,150,354 | 9/1992 | Iwata et al. | 369/291 |
| 5,475,674 | 12/1995 | Yamashita et al. | 360/133 |

FOREIGN PATENT DOCUMENTS

| | | |
|---|---|---|
| 0335461 | 10/1989 | European Pat. Off. . |
| 0368347 | 5/1990 | European Pat. Off. . |
| 0421775 | 4/1991 | European Pat. Off. . |
| 2272990 | 6/1994 | United Kingdom . |

*Primary Examiner*—Stuart S. Levy
*Assistant Examiner*—Kevin M. Watkins
*Attorney, Agent, or Firm*—Cushman Darby & Cushman IP Group of Pillsbury Madison & Sutro LLP

[57] ABSTRACT

A cartridge body storing an optical disc has a disc inlet/outlet port for taking the disc in and out. A lid member is mounted on the cartridge body to be rotatable between a closed position and an opened position. The lid member has a pair of guide rails extending from the lid member into the cartridge body and facing the surfaces of the disc. Each guide rail has a guide hole. The cartridge body has guide grooves in which the guide rails slide, and a guide pin slidably inserted into the guide holes of the guide rails. During the opening and closing operation of the lid member, the guide grooves and guide pin guide the guide rails.

15 Claims, 4 Drawing Sheets

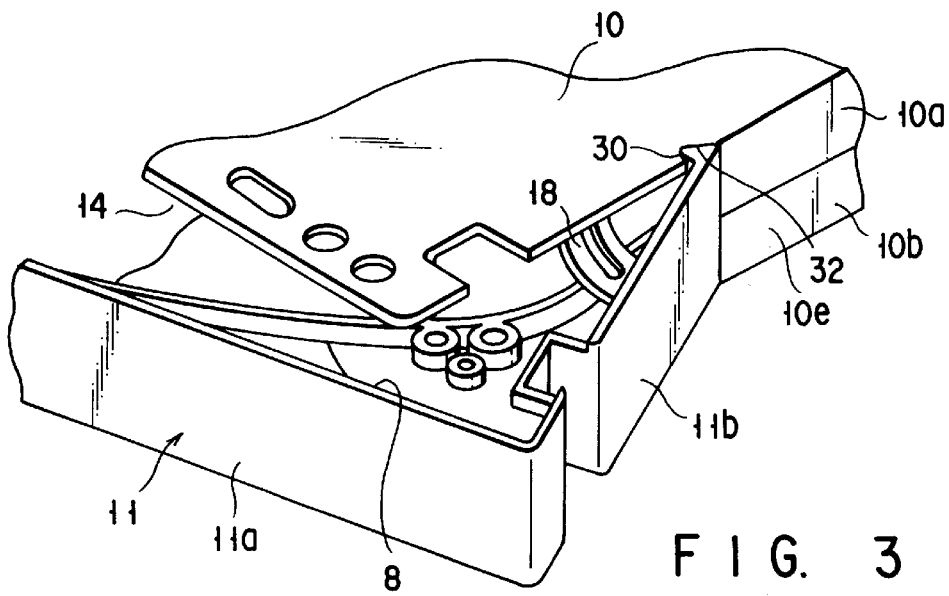
F I G. 3
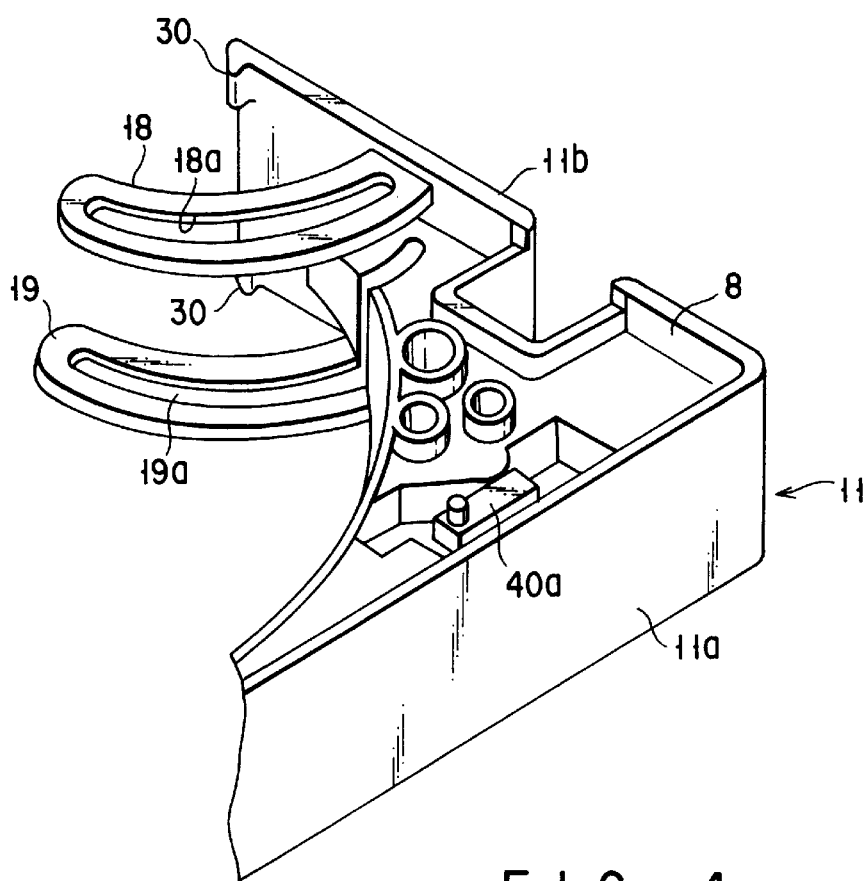
F I G. 4

DISC CARTRIDGE HAVING LID MEMBER WITH GUIDE PORTIONS

BACKGROUND OF THE INVENTION

1. Field of the Invention

The present invention relates to a disc cartridge which contains a disc-like recording medium such as an optical disc, magneto-optical disc, a magnetic disc or the like and which has an opening section for allowing access to the recording medium to record and/or reproduce an information signal.

2. Description of the Related Art

Conventionally, a disc cartridge comprises a flat rectangular cartridge body consisting of an upper case and a lower case coupled with each other, and a disc such as an optical disc, magneto-optical disc, or an magnetic disc, rotatably contained in the cartridge body. Each of the upper and lower cases has an opening portion for exposing that region of the disc which extends from the center portion of the disc to the outer peripheral portion thereof. A pick-up and a turn-table for rotating the disc of a recording reproduction device are accessible to the disc through the opening portions. In addition, the cartridge body is equipped with a slidable shutter for closing and opening the opening portions, the shutter being made of a thin metal plate or hard synthetic resin.

When a disc cartridge having the above-mentioned structure is loaded into a disc recording/reproducing device, the shutter is slid at first to an end side of the cartridge body by a shutter open/close means, thereby opening the opening portions. Subsequently, a turn-table is inserted into the cartridge body through one of the opening portions to support the disc, and a pick-up faces the surface of the disc through the opening portion. In this state, the disc is rotated by the turn-table, and recording and/or reproduction is performed by the pick-up.

In this kind of disc cartridge, the disc is contained in the cartridge body and the opening portions are closed by the shutter when the disc cartridge is not used, thus realizing safe disc storage. In addition, since the shutter is slid so that the disc in the cartridge body is exposed through the opening portions, to enable recording and reproduction, permanent use of the disc is realized.

In the disc cartridge having the structure described above, however, disc protection is provided to insure long life of the disc, but the disc cannot be taken out of the cartridge body so that it is difficult to directly load the disc to the disc recording/reproducing device. This kind of disc cartridge thus has severe limitations in view of degree of freedom in disc use.

Particularly, in recent years, there has been a need for a disc cartridge applicable to both a disc recording/reproducing device used with the disc loaded directly thereto, and a disc recording/reproducing device used with the entire disc cartridge loaded thereto.

SUMMARY OF THE INVENTION

The present invention has been made in view of the above described need, and its object is to provide a disc cartridge which is capable of two disc use modes, i.e., a mode using a disc cartridge and another mode of solely using a disc, while also limiting the size of the cartridge.

In order to achieve the above object, a disc cartridge according to the present invention comprises: a cartridge body for containing a disc-like recording medium kept rotatably, the cartridge body including an opening portion for exposing a part of a surface of the recording medium, and a disc inlet/outlet port for taking the recording medium in and out of the cartridge; a shutter slidably mounted on the cartridge body, for opening/closing the opening portion; a lid member attached to the cartridge body to be movable between a closed position wherein the lid member closes the disc inlet/outlet port and an opened position wherein the lid member opens the inlet/outlet port; and guide means for guiding opening/closing operation of the lid member, the guide means having a guide member extending from the lid member into the cartridge body and being movable within a plane substantially parallel to the surface of the recording medium contained in the cartridge body, in accordance with opening/closing of the lid member.

According to the disc cartridge constructed in the structure as described above, a recording medium can be taken in and out through the disc inlet/outlet port, by moving the lid member to the opened position so as to open the disc inlet/outlet port. As a result, the disc cartridge is applicable to both types of recording/reproducing devices, i.e., a type of recording reproducing device which performs recording/reproducing on a recording medium contained in a cartridge body, and another type of recording/reproducing device which performs recording/reproducing information on a recording medium loaded directly thereon. The range of use of the disc cartridge can thus be enhanced.

In addition, during opening or closing operation of the lid member, the guide member extending from the lid member moves within a plan substantially parallel to the surfaces of the recording medium, thereby guiding the lid member. As a result, the lid member achieves stable opening and closing operation, and can be sufficiently opened. Therefore, the size of the disc inlet/outlet port of the cartridge body, which is opened and closed by the lid member, can be set to minimum dimensions corresponding to the diameter of the recording medium. Accordingly, the size of the cartridge body itself can be reduced to substantially the same level as that of a conventional disc cartridge structure with no inlet/outlet port and a lid member.

Further, according to the present invention, the lid member for closing the cartridge body has a color different from the color of the cartridge body.

Accordingly, when the disc is used in an application mode of a cartridge structure, the direction in which the cartridge body should be loaded into a disc drive device can be identified, so that wrong insertion of the cartridge body into a disc drive device can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 5 show a disc cartridge according to an embodiment of the present invention, in which:

FIG. 1 is a perspective view of the disc cartridge,

FIG. 2 is a plan view showing a lower casing of the disc cartridge and a lid member thereof being opened, FIG. 3 is a perspective view showing a support portion of the lid member and a part of the cartridge body, FIG. 4 is an enlarged perspective view showing the support portion of the lid member, and FIG. 5 is a sectional view taken along the line V—V of FIG. 1.

DETAILED DESCRIPTION OF THE PREFERRED EMBODIMENTS

A disc cartridge according to an embodiment of the present invention will now be described in detail with reference to the accompanying drawings.

Figure 1:
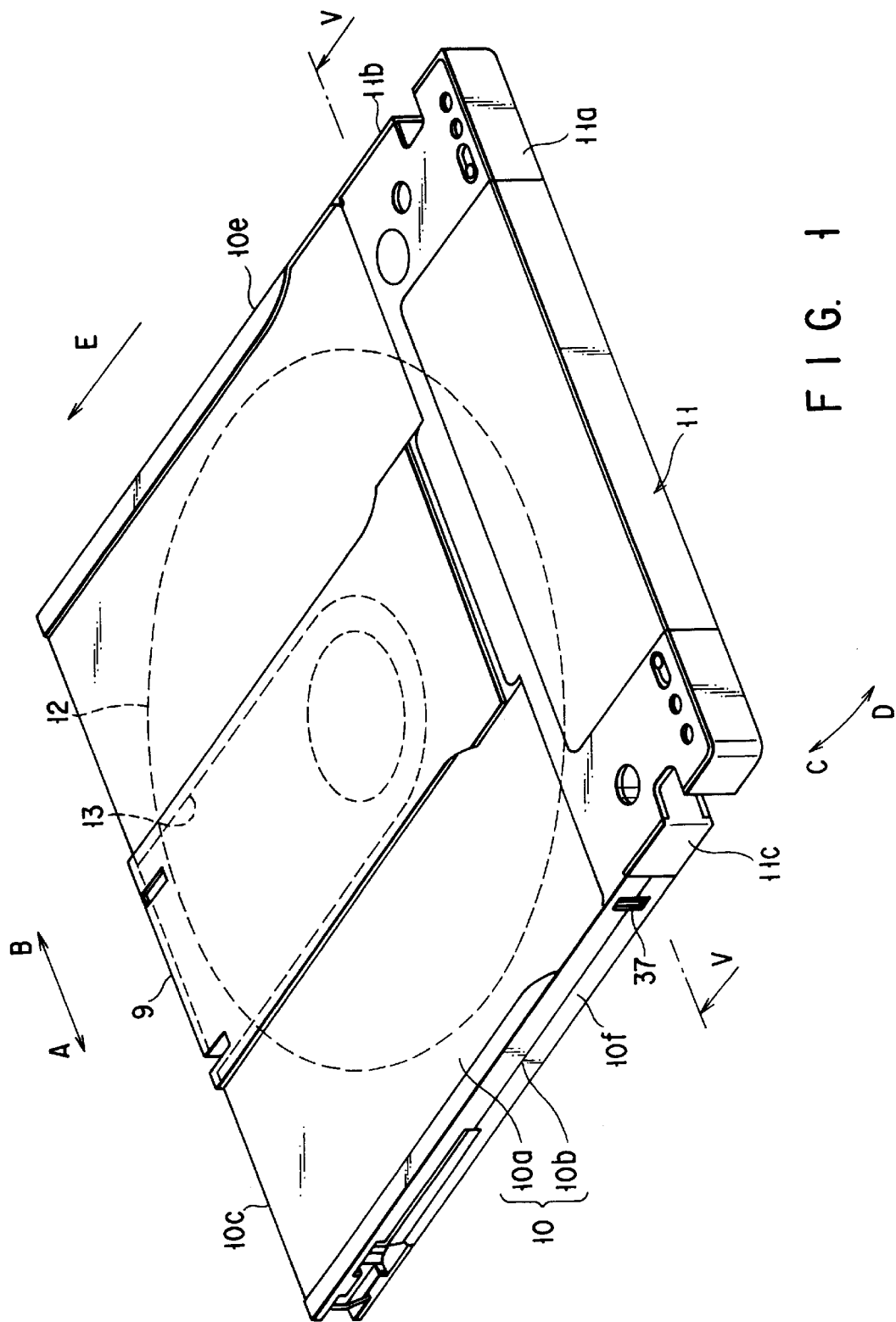
Figure 2:
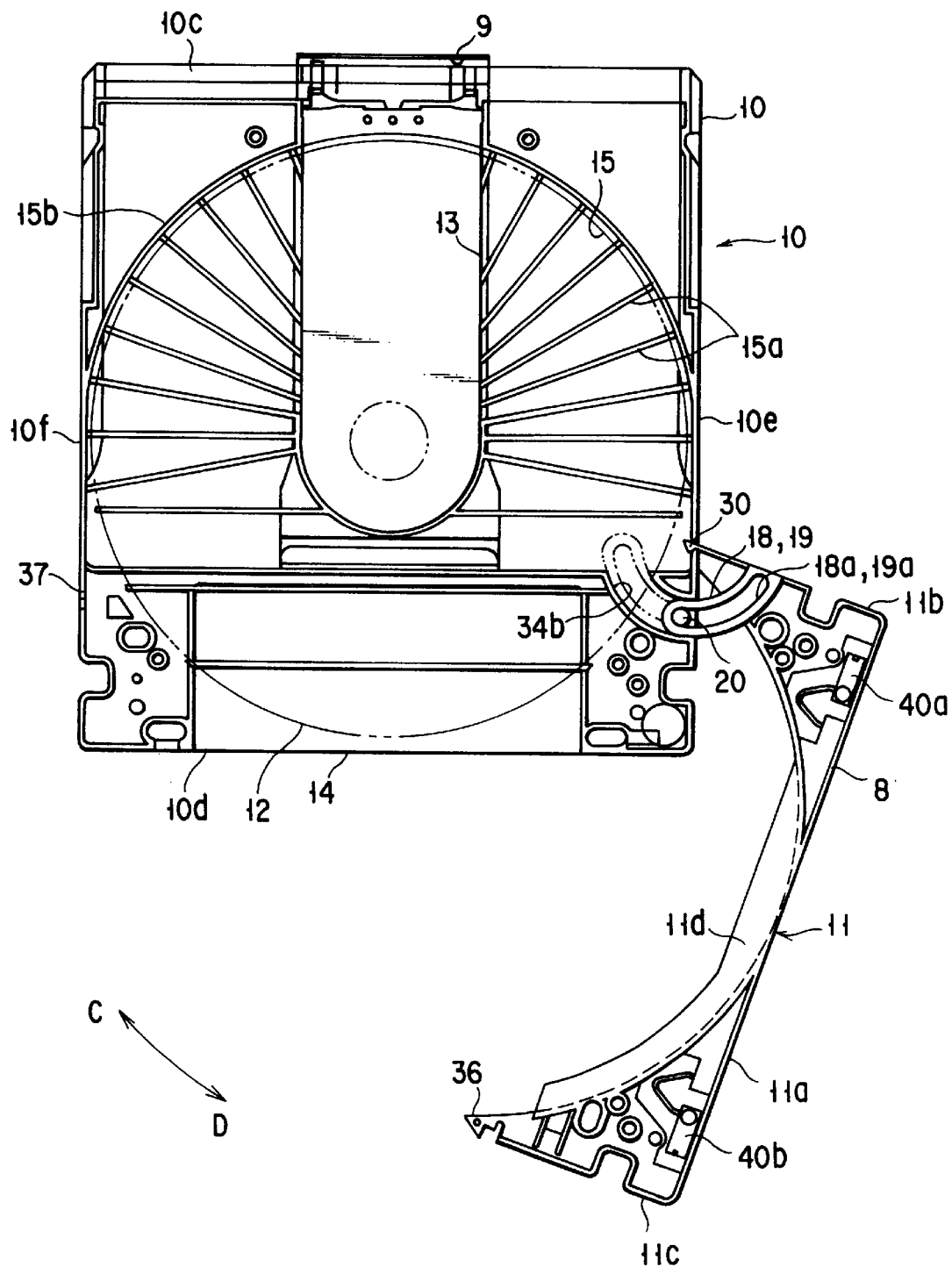

As shown in FIGS. 1 and 2, the disc cartridge comprises a flat rectangular box-like cartridge body 10 and an optical disc 12 stored rotatably in the cartridge body. A disc having information recording surfaces on both sides is used as the optical disc 12. The cartridge body 10 includes a pair of main walls which respectively face the surfaces of the optical disc 12 and are parallel to each other, and four side walls (or side end surfaces) which are continuous with the side edges of each main wall.

The cartridge body 10 includes an upper casing 10a and a lower casing 10b which are substantially symmetrical to each other and made of synthetic resin such as ABS or the like. The cartridge body 10 is constructed by coupling the upper and lower casings 10a and 10b with each other. Further, a disc storing portion 15 described later is defined within the cartridge body 10, and stores the optical disc 12 in a state that the disc 12 is rotatable with a predetermined clearance with respect to the inner surfaces of the cartridge body 10. The upper and lower casings 10a and 10b respectively face the surfaces A and B of the optical disc 12.

In addition, an opening 13 is formed in each of the upper and lower casings 10a and 10b. The openings 13 have a predetermined width, extend to the vicinity of the front end surface 10c (or a first side surface) from the center portions of the casings, and face each other. These openings 13 respectively face the surfaces A and B of the optical disc 12 stored in the cartridge body 10, exposing the optical disc to the outside over the region from the rotation center of the disc to the outer periphery thereof.

The cartridge body 11 is provided with a shutter 9 of a double-side integral type which opens/closes both of the openings 13. The shutter 9 has a substantially U-shaped cross-section and is fitted onto the cartridge body 10 from the front end surface 10c side so as to sandwich both surfaces of the cartridge body. As shown in FIG. 1, the shutter 9 is slidable between a closed position wherein the shutter closes the openings 13 and two open positions defined in both sides of the closed position wherein the shutter opens the openings 13, in a direction (or direction A-B) parallel to the front end surface 10c of the cartridge body 11. Further, the shutter 9 is continuously urged toward the closed position by shutter springs not shown.

Figure 5:
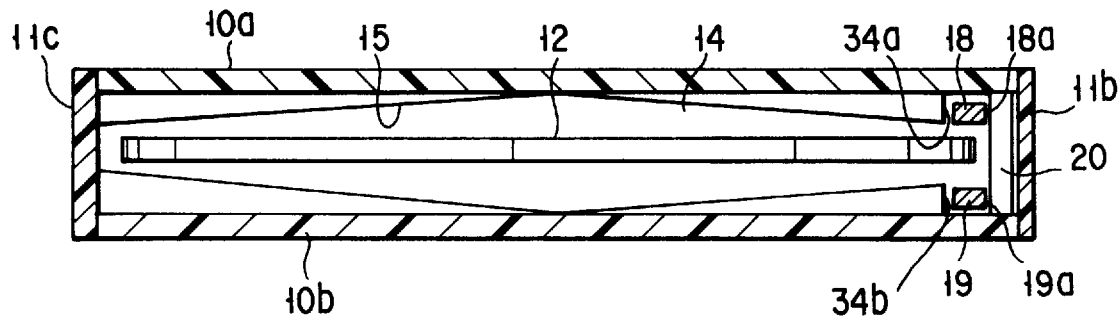
Figure 6:
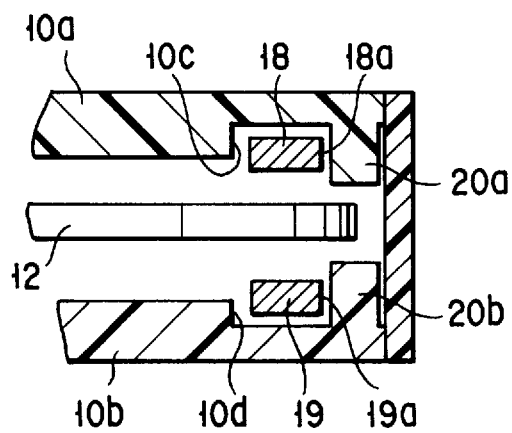
FIG. 6 is a sectional view showing a modification of the present invention.

As shown in FIG. 2, a disc inlet/outlet port 14 for inserting/extracting the optical disc 12 into/from the cartridge body 10 is formed at a rear end portion of the cartridge body 10. More specifically, the disc inlet/outlet port 14 is opened over the rear end surface 10d (or a second side surface), and the rear end portions of both of left and right side surfaces 10e and 10f (or second and third side surfaces) of the cartridge body 10. As shown in FIG. 5, the disc inlet/outlet port 14 has a center region through which the center portion of the optical disc 12 passes, and both end regions through which circumferential edge portions of the optical disc 12 pass. Further, the disc inlet/outlet port 14 is formed to be symmetrical in the lateral direction such that the port is widest in the center region and becomes gradually narrower toward both end regions and such that the port has a substantially rhombus cross-section.

Here, supposing that the insert direction in which the disc cartridge is inserted into a disc recording/reproducing device not shown is E in FIG. 1, the end surface of the disc cartridge body 10 positioned in the forward side in the insert direction E is defined as the front end surface 10c, while the end surface of the disc cartridge body positioned in the backward side in the insert direction is defined as the rear end surface 10d.

As shown in FIG. 2, on the inner surfaces of the upper and lower casings 10a and 10b (only the lower casing of which is shown in the figure), a number of ribs 15a extending in the radial direction from the center of the lower casing corresponding to the center of the optical disc 12 and a rib 15b having a substantial semi-circular shape coaxial with the center of the lower casing are provided. The disc storing portion 15 is defined by the ribs 15a and 15b and the inner surfaces of the casings 10a and 10b. Further, the disc inlet/outlet port 14 communicates with the disc storing portion 15.

The cartridge body 10 is equipped with a lid member 11 for opening/closing the disc inlet/outlet port 14, such that the lid member 11 is rotatable in the arrow direction C-D. As shown in FIGS. 1 to 4, the lid member 11 is shaped like a flat elongate plate having such a thickness which allows the lid member 11 to be inserted into the disc storing portion 15 thorough the port 14. In addition, the lid member 11 has a main wall portion 11a and side wall portions 11b and 11c, and is substantially U-shaped as a whole. The main wall portion 11a has a length substantially equal to the width of the cartridge body 10 and forms the rear end surface 10d of the cartridge body 10, in the closed position. The side wall portions 11b and 11c extend at right angles from both ends of the main wall portion 11a, and respectively form the rear end portions of both side surfaces 10e and 10f of the cartridge body 10, in the closed position.

The lid member 11 is provided with a flange 8 extending substantially over the entire outer peripheral edge of the lid member 11. The lid member 11 is integrally formed of synthetic resin, and particularly formed of resin of a color different from the cartridge body 10.

As shown in FIGS. 1 to 4, the lid member 11 has a pair of engaging projections 30 projecting from the inner surface of the extended end of the side wall portion 11b, and these projections 30 are detachably engaged in engagement recesses 32 formed in the side surface 10e of the cartridge body 10 in the vicinity of the disc inlet/outlet port 14. As a result of this, the lid member 11 can be rotated around the engaging projections 30 between the closed position shown in FIG. 1 where the lid member 11 closes the disc inlet/outlet port 14 and the opened position shown in FIG. 2 where lid member 11 opens the disc inlet/outlet port.

When rotated to the closed position, the lid member 11 enters into the disc container portion 15 through the disc inlet/outlet port 14, and the flange 8 abuts against the rear end edge of the cartridge body 10 and both side edge rear end portions thereof, thereby closing the disc inlet/outlet port 14.

In addition, the lid member 11 integrally includes a pair of guide rails 18 and 19 projecting from a middle portion of the inner surface of the side wall 11b. These guide rails 18 and 19 are each shaped so as to be arcuate about the engaging projections 30 as the rotational center of the lid member 11, and extend to the vicinity of a line connecting the extended ends of the side wall portions 11b and 11c. Guide holes 18a and 19a are respectively formed in the guide rails 18 and 19, substantially over the entire length of the guide rails. These guide holes 18a and 18b are each also shaped so as to be arcuate about the engaging projections 30 as the rotational center, in corresponding with the rotation course of the lid member 11.

The guide rails 18 and 19 extend at right angles to the side wall portion 11b of the lid member 11, and face each other such that the rails are in parallel with each other, with a predetermined interval therebetween. In addition, the guide rails 18 and 19 are inserted into the cartridge body 10 through the disc inlet/outlet port 14, so as to sandwich the optical disc 12 contained in the disc container portion 15 of the cartridge body 10, from both surface sides. The guide rails 18 and 19 respectively face the surfaces of the optical disc 12, such that the guide rails are parallel to the surfaces of the disc, with predetermined distances maintained from the surfaces, respectively.

Meanwhile, guide grooves 34a and 34b for slidably guiding the guide rails 18 and 19 are formed in the upper and lower casings 10a and 10b, respectively. These guide grooves 34a and 34b are arcuately shaped so as to correspond to the guide rails 18 and 19.

In addition, a guide pin 20 serving as a guide convex portion is slidably inserted in the guide holes 18a and 19a of the guide rails 18 and 19. This guide pin 20 extends vertically from the lower casing 10b, for example. The top end of the guide pin 20 is fitted in a recess not shown, formed in a predetermined position of the upper casing 10a.

Upon rotating between the closed position and the opened position, the guide rails 18 and 19 are guided by means of the guide grooves 34a and 34b and the guide pin 20 on the cartridge body 10 side, thereby guiding the rotation of the lid member 11. While the lid member 11 is thus rotated between the closed position and the opened position, the guide pin 20 relatively moves within the guide holes 18a and 19a, and the guide pin 20 is brought into contact with ends of the guide holes 18a and 19a, there by in the closed position, thereby functioning as a stopper which limits excessive rotation of the lid member 11.

In addition, the lid member 11 is provided with an arcuated disc-receiving portion 11d, so as to correspond to the disc storing portion 15 of the cartridge body 10. The disc-receiving portion 11d forms a part of the disc storing portion 15 when the lid member 11 is rotated in the arrow direction C to close the disc inlet/outlet port 14. When the optical disc 12 contained in the disc storing portion 15 is taken out through the disc inlet/outlet port 14 with the lid member 11 kept rotated in the arrow direction D, the disc-receiving portion 11d temporally receives the circumferential edge of the optical disc 12, thus preventing the optical disc from suddenly falling from the cartridge body 10.

A lock claw 36 is integrally formed at the extended end of the other side wall portion 11c of the lid member 11, and an engaging hole 37 which can be engaged with the lock claw 36 is formed in the rear end portion of the left side wall 10f of the cartridge body 10. Therefore, when the lid member 11 is rotated to the closed position where the lid member 11 closes the disc inlet/outlet port 14, the lock claw 36 is elastically engaged with the engage hole 37, thereby locking the lid member 11 in the closed position. Note that this locking can be released and the lid member 11 can be opened, by pushing inwards the lock claw 36 through the engaging hole 37 from the outside of the cartridge body 10.

In addition, a pair of write protect operating members 40a and 40b respectively corresponding to the surfaces A and B of the optical disc 12 are integrally formed on the lid member 11. These members 40a and 40b can be operated from outside the cartridge body 10, with the lid member 11 kept closed.

When the disc cartridge constructed as described above is loaded into a disc recording/reproducing device not shown in the inset direction E shown in FIG. 1, the shutter 9 is slid toward an end side (to the left or right) at first by a shutter opening/closing means of the recording/reproducing device, and the openings 13 are thereby opened. Then, a turn table not shown enters through one of the openings 13 into the cartridge body 11 and rotatably supports the optical disc 12. An optical pick-up not shown faces one surface of the optical disc 12 through the opening 13.

In this state, the optical disc 12 is rotated by the turn-table, and information signals are recorded on and/or reproduced from the optical disc 12 by the optical pick-up. To record information into the optical disc 12, one of write protect operating members 40a and 40b which corresponds to the recording surface of the disc 12 must be previously set to the write allowable position.

To extract the optical disc 12 from the cartridge body 10, the lock claw 36 of the lid member 11 is pushed from outside against it's own elasucity, so that the claw 36 leaves the engaging hole 37, and the lid member is rotated in the arrow direction D. In this case, the lid member 11 is rotated around the engaging projections 30 serving as the rotation fulcrum, until ends of the guide holes 18a and 19a formed in the guide rails 18 and 19 are brought into contact with the guide pin 20 inserted in the guide holes.

Then, the optical disc 12 stored in the disc storing portion 15 of the cartridge body 11 is guided to the disc receive portion lid of the lid member 11, passing through the disc inlet/outlet port 14, so that extraction of the disc is enabled. The optical disc 12 thus extracted, i.e., a so-called naked disc is loaded into a disc drive device not shown and is put to use.

Meanwhile, the optical disc 12 is inserted back into the cartridge body 10, by passing disc 12 through the disc inlet/outlet port 14 into the disc storing portion 15 of the cartridge body 10, with the lid member 11 kept rotated to the opened position. Thereafter, the lid member 11 is rotated in the arrow direction C from the opened position to the closed position. In this case, the lid member 11 is rotated around the engaging projections 30 as the rotation fulcrum, and the guide rails 18 and 19 are guided by the guide pin 20 and the guide grooves 34a and 34b of the cartridge body 10, so as to face the surfaces of the optical disc 12. When the lid member 11 is rotated and reaches the closed position, the lock claw 36 is engaged with the engaging hole 27, and the lid member 11 is locked in the closed position. As a result, the disc inlet/outlet port 14 of the cartridge body 10 is closed by the lid member 11, and the optical disc 12 is contained in the cartridge body 10.

According to the disc cartridge having the above mentioned structure, the disc cartridge comprises a cartridge body 10 having a disc inlet/outlet port 14 and a lid member 11 for opening/closing the disc inlet/outlet port. It is therefore possible to realize a disc cartridge structure which enables two disc use modes, i.e., a disc use mode in which the optical disc 12 contained in the cartridge body 10 is loaded to a disc drive device of a cartridge structure application type, and a disc use mode in which the optical disc 12 extracted from the cartridge body 10 is loaded to a disc drive device of a disc single use type of using an optical disc solely.

Further, according to the disc cartridge as described above, the disc inlet/outlet port 14 is formed over an area including the rear end surface and end portions of both side surfaces of the cartridge body 10, so that a sufficiently large opening area is obtained. In addition, the lid member 11 has a rotation fulcrum provided at the extended end of the side wall portion 11b, and has a pair of guide rails 18 and 19 for guiding opening/closing movement of the lid member. When the lid member 11 is opened/closed, the guide rails 18 and 19 are guided by the guide pin 20 and the guide grooves 34a and 34b of the cartridge body 10, so that the lid member 11 moves kept facing the surfaces of the optical disc 12 in the cartridge body 10. Therefore, the lid member 11 can be opened and closed stably while being guided by the guide rails 18 and 19, and the lid member can be rotated to an opened position where the disc inlet/outlet port 14 is sufficiently opened.

Accordingly, the entire disc inlet/outlet port 14 can be efficiently used to realize extraction and insertion of the optical disc 12, and the size of the cartridge body 10 can be designed with the smallest size corresponding to the disc diameter. Therefore, the size of the disc cartridge can be reduced to be substantially equal to the size of a conventional disc cartridge which has no disc inlet/outlet port and lid member. As a result of this, it is possible to obtain a disc cartridge wherein an optical disc 12 can be used in two disc use modes, while ensuring reduction in size.

Further, according to the disc cartridge as described above, the lid member 11 is of a color different from the cartridge body 10, and therefore, the direction in which the cartridge body should be loaded into a disc drive device can be easily identified, so that the cartridge body is effectively prevented from being loaded in a wrong manner.

Note that the present invention is not limited to the above mentioned embodiment, but can be variously modified within the scope of the present invention.

For example, the above explanation has been made to an embodiment applied to an optical disc 12 having signal recording surfaces on both sides. However, the present invention is not limited thereto, but can be applied to a disc which has a signal recording surface on only one side. In addition, the recording medium contained in the cartridge body is not limited to an optical disc, but any other kind of disc-like recording medium such as a magnetic disc, a magneto-optical disc, or the like is applicable.

In the above embodiment, the engaging projections 30 are provided at an end portion of the lid member 11, and are engaged with the engagement recesses 32 formed in the cartridge body 10, to constitute a rotation fulcrum. However, in the present invention, the engaging projections and engagement recesses may be omitted, and the structure may be arranged such that the lid member is opened and closed by means of only the guide rails 18 and 19 of the lid member 11, and the guide pin 20 and guide grooves 34a and 34b of the cartridge body.

Further, the guide convex portion is not limited to the guide pin 20 which is inserted in the guide holes 18a and 19a of the guide rails 18 and 19. In place of the guide pin, guide projections may be provided on the bottom of the guide grooves 34a and 34b of the upper and lower casings 10a and 10b, and these guide projections may be respectively inserted in the guide holes 18a and 19a of the guide rails 18 and 19.

In the above embodiment, a pair of guide rails 18 and 19 are provided for the lid member 11 such that the rails sandwich the disc surfaces of the optical disc 12 stored in the disc storing portion 15. However, the present invention is not limited thereto, but only one guide rail may be provided for the lid member.

The disc inlet/outlet port 14 is provided at an end portion (i.e., the rear end surface 10d) opposite to the openings 13 of the cartridge body 10. However, the port 14 may be formed at another end portion of the cartridge body 10 except for the end portion (i.e., the front end surface 10c) where the opening 13 of the cartridge body 10 is provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disc cartridge comprising:
   a cartridge body for containing a disc-like recording medium rotatably mounted therein, the cartridge body including an opening for exposing a part of a surface of the recording medium and a disc inlet/outlet port for taking the recording medium in and out of the cartridge body;
   a shutter slidably mounted on the cartridge body for opening and closing the opening;
   a lid member mounted on the cartridge body to be movable between a closed position and an opened position with respect to the inlet/outlet port; and
   guide means for guiding the opening and closing of the lid member, the guide means being movable within a plane substantially parallel to the surface of the recording medium contained in the cartridge body during the opening and closing of the lid member,
   the guide means including:
      a pair of guide members extending from the lid member into the cartridge body and positioned so as to face both surfaces of the recording medium, with the recording medium located between the pair of guide members when the lid member is in the closed position,
      guide holes formed in the respective guide members and extending along a path of movement of the lid member, and
      a guide convex portion provided at the cartridge body and slidably engaged in both of the guide holes so as to slide within the guide holes when the lid member is moved between the closed and opened positions.

2. A disc cartridge according to claim 1, wherein the lid member includes an engaging portion rotatably engaged with the cartridge body and defining a rotation fulcrum of the lid member.

3. A disc cartridge according to claim 1, wherein the guide means includes a guide groove formed in the cartridge body, in which the guide member slides.

4. A disc cartridge according to claim 1, wherein the cartridge body has a flat rectangular box-like shape including a pair of opposed main surfaces generally parallel with each other and respectively facing the surfaces of the recording medium disposed therebetween, a first side surface extending between opposed edges of the main surfaces for the respective entire lengths thereof and opposed third and fourth side surfaces generally parallel with each other and extending from opposite ends of the first side surface and generally perpendicular thereto and extending between opposed edges of the main surfaces for less than the respective entire lengths thereof;

the disc inlet/outlet port has a first portion extending along an entire edge of the main surfaces opposite said first side surface and a pair of second portions continued with the first portion and defined between opposed ends of the third and fourth side surfaces and ends of the opposed edges of the main surfaces between which the third and fourth side surfaces extend, and the lid member has a main wall portion forming a second side surface opposite the first side surface, and a pair of side wall portions extending from both ends of the main wall portion and coextending with the third and fourth side surfaces when the lid member is in the closed position.

5. A disc cartridge according to claim 4, wherein the lid member has an engaging portion provided at an end of one of the side wall portions thereof and rotatably engaged with one of the third and fourth side surfaces of the cartridge body.

6. A disc cartridge according to claim 5, wherein the guide member has a guide rail extending from the one side wall portion of the lid member into the cartridge body through one of the second portions of the disc inlet/outlet port.

7. A disc cartridge according to claim 6, wherein the guide hole extends in an arc-like shape around the engaging portion as a center.

8. A disc cartridge according to claim 5, wherein the lid member has a lock claw provided at an extended end of the other side wall portion and engaged with the cartridge body, in the closed position, for locking the lid member in the closed position.

9. A disc cartridge according to claim 1, wherein the lid member has a disc receiving portion for receiving a part of circumferential edge portion of the recording medium, in the closed position.

10. A disc cartridge according to claim 1, wherein the lid member is of a color different from that of the cartridge body.

11. A disc cartridge comprising:

a cartridge body for containing a disc-like recording medium rotatable mounted therein, the cartridge body including an opening for exposing a part of a surface of the recording medium, and a disc inlet/outlet port for taking the recording medium in and out of the cartridge body;

a shutter slidably mounted on the cartridge body for opening and closing the opening;

a lid member mounted on the cartridge body to be movable between a closed position and an open position with respect to the inlet/outlet port; and guide means for guiding the opening and closing of the lid member, the guide means including:

a pair of guide members extending from the lid member into the cartridge body and positioned so as to face both surfaces of the recording medium, with the recording medium located between the pair of guide members when the lid member is in the closed position, the guide means having guide holes formed therein and extending along a path of movement of the lid member, and a pair of guide convex portions provided on the cartridge body and slidably engaged in each of the guide holes, so as to slide within the guide holes when the lid member is moved between the closed and opened positions.

12. A disc cartridge according to claim 11, wherein the cartridge body has a flat rectangular box-like shape including a pair of opposed main surfaces generally parallel with each other and respectively facing the surfaces of the recording medium disposed therebetween, a first side surface extending between opposed edges of the main surfaces for the respective entire lengths thereof and opposed third and fourth side surfaces generally parallel with each other and extending from opposite ends of the first side surface and generally perpendicular thereto and extending between opposed edges of the main surfaces for less than the respective entire lengths thereof;

the disc inlet/outlet port has a first portion extending along an entire edge of the main surfaces opposite said first side surface and a pair of second portions continued with the first portion and defined between opposed ends of the third and fourth side surfaces and ends of the opposed edges of the main surfaces between which the third and fourth side surfaces extend, and the lid member has a main wall portion forming a second side surface opposite the first side surface, and a pair of side wall portions extending from both ends of the main wall portion and coextending with the third and fourth side surfaces when the lid member is in the closed position.

13. A disc cartridge according to claim 12, wherein the lid member has an engaging portion provided at an end of one of the side wall portions thereof and rotatably engaged with one of the third and fourth side surfaces of the cartridge body.

14. A disc cartridge according to claim 13, wherein the guide member has a guide rail extending from the one side wall portion of the lid member into the cartridge body through one of the second portions of the disc inlet/outlet port.

15. A disc cartridge according to claim 14, wherein the guide holes extend in an arc-like shape around the engaging portion as a center.

* * * * *